United States Patent
Alapuranen et al.

(10) Patent No.: US 6,269,093 B1
(45) Date of Patent: Jul. 31, 2001

(54) ADAPTIVE REMOVAL OF DISTURBANCE IN TDMA ACOUSTIC PERIPHERAL DEVICES

(75) Inventors: Pertti Alapuranen, Kontio; Ingo Kuhn; Janne Paksuniemi, both of Oulu, all of (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 08/991,763

(22) Filed: Dec. 16, 1997

(51) Int. Cl.[7] .................................................. H04J 1/00
(52) U.S. Cl. ......................... 370/343; 375/132; 375/285
(58) Field of Search ................................. 370/336, 345, 370/522, 343; 375/229, 332, 285, 340, 143, 152, 343, 131, 135, 132

(56) References Cited

U.S. PATENT DOCUMENTS

| | | | |
|---|---|---|---|
| 4,177,521 | * 12/1979 | Schaefer, III | 365/8 |
| 4,244,376 | * 1/1981 | Fisher et al. | 600/544 |
| 4,327,440 | * 4/1982 | Furuya et al. | 375/317 |
| 4,777,653 | * 10/1988 | Bonnerot et al. | 375/285 |
| 5,123,031 | 6/1992 | Kuisma | 375/60 |
| 5,214,708 | * 5/1993 | McEachern | 704/266 |
| 5,251,263 | 10/1993 | Andrea et al. | 381/71 |
| 5,260,974 | * 11/1993 | Johnson et al. | 375/317 |
| 5,479,444 | 12/1995 | Malkamaki et al. | 375/231 |
| 5,511,068 | * 4/1996 | Sato | 370/335 |
| 5,675,613 | * 10/1997 | Uwano et al. | 375/285 |
| 5,684,830 | * 11/1997 | Ichikawa et al. | 375/285 |
| 5,720,039 | * 2/1998 | Lieberman | 455/10 |
| 5,742,591 | * 4/1998 | Himayat et al. | 370/286 |
| 5,920,834 | * 7/1999 | Sih et al. | 704/233 |
| 5,960,389 | * 9/1999 | Jarvinen et al. | 704/220 |

FOREIGN PATENT DOCUMENTS 2034354  7/1991 (CA).

OTHER PUBLICATIONS

Kubota et al., Improved ADPCM Voice Signal Transmission Employing Click–Noise Detection Scheme for TDMA–TDD Personal Communication Systems, IEEE transactions on vehicular technology, 108–113, Feb. 1997.*
European digital cellular telecommunications system (Phase 2); Voice Activity Detection(VAD) (GSM 06.32), ETSI, Mar. 1995, pp. 1–41.

* cited by examiner

*Primary Examiner*—Melvin Marcelo
*Assistant Examiner*—Jasper Kwoh

(57) ABSTRACT

Methods and apparatus are disclosed for suppressing transmitter burst mode disturbances in an audio band. The method and apparatus detects those signal frames wherein the input signal contains signal energy comprised substantially of only the disturbance signal; characterizes the disturbance signal in the detected signal frames to obtain a disturbance signal correction; and compensates the input signal, only for those signal frames where a transmission burst exists, using the obtained disturbance signal correction so as to remove the disturbance signal from those signal frames that contain voice, and also from certain signal frames that do not contain voice. Frequency hopping embodiments of disturbance removing circuitry are also disclosed.

3 Claims, 12 Drawing Sheets

ADAPTIVE REMOVAL OF DISTURBANCE IN TDMA ACOUSTIC PERIPHERAL DEVICES

FIELD OF THE INVENTION

This invention relates to methods and apparatus for removing Time Division Multiple Access (TDMA) induced disturbances in an audio signal.

BACKGROUND OF THE INVENTION

A Time Division Multiple Access (TDMA) system transmits and receives data in time slots. Well-known types of wireless TDMA systems are the European digital cellular telephone system known as the Global System for Mobile communications (GSM) and the U.S. digital cellular telephone system (e.g., IS-136). For GSM the use of TDMA implies that all of the transmit energy of the signal is concentrated in ⅛ of the frame time. The transmitted time slot is often called a TX burst.

Acoustic peripheral devices induce harmonics of these TX bursts. The result is an undesirable audible humming sound that emanates from the loudspeaker. The magnitude of the hum depends on a number of factors, such as the electrical construction of a hybrid in the peripheral device, the distance of the TDMA transmitter from the peripheral device, the mechanical construction of both devices, the strength of the received signal in the GSM transceiver that in turn determines the strength of the transmitted signal, the phase of the call (e.g., the call set-up phase and the call connected phase may have different TX levels), and certain GSM features (e.g., Discontinuous Transmission (DTX) and frequency hopping).

When the transmitter and the peripheral device can be mechanically constructed in a predetermined manner, the audible humming can be eliminated by preventing the induction of TX energy into the audio band circuits. However this is not always possible or desirable. For example, mobile station (e.g., cellular telephone) peripheral devices are typically sold as separate units that connect to a mobile station through a standard interface. As such, it is difficult or impossible to control the layout and relative positions of the transmitter and the audio band circuits.

The frequency of the induced TX signal corresponds to the frame time, wherein one time slot (and the TX burst) is transmitted per frame from the mobile station. For the GSM case one frame is 4.615 ms in duration, which equals a frequency of 216.667 Hz (i.e., about 217 Hz). The shape of the induced 217 Hz noise pulses is dependent on the mechanical construction, as well as the distance to the audio device, the orientation of the device, the construction of the coils in the speaker and microphone, etc., and can vary significantly with changes in these mechanical parameters. The nature of the undesirable disturbance in phase, shape and amplitude cannot thus be determined a priori.

Furthermore, because of the multi-frame structure in GSM and the multiplexing of different logical channels into a dedicated channel, not every frame will contain a TX burst. By example, Slow Associated Control Channels (SACCH) are inserted every 13th frame and IDLE frames are inserted every 26th frame (for a full rate traffic channel), resulting in drop outs of the disturbance every 120 ms. For half rate frames, every 26th frame contains the SACCH, but only every second frame contains a TX burst for traffic data. As such, further variability of the audio hum can occur.

Another factor that influences the cyclo-stationary disturbance arises from the Discontinuous Transmission (DTX) mode of operation. The DTX mode is used in order to reduce overall interference of multiple users in the system by transmitting speech data only when the user is talking. Furthermore, in GSM there exists a so-called hangover period of four speech frames, meaning that the DTX function does not mute the transmission immediately when no speech is detected (typically by a Voice Activity Detector (VAD)). In this case so-called Comfort Noise Update (CNU) frames are transmitted, as long as there is no speech, at the rate of 1 CNU frame every 480 ms. The DTX mode of operation is controlled by the base station in such a manner that it informs the mobile station to either use or not use DTX, or leaves the decision to the mobile station.

FIG. 1 illustrates one example of a disturbance 9 that is induced into the audio signal of a peripheral device 2 that is connected to a GSM Fixed Wireless terminal 1 via a 2-wire connection comprised of an output loudspeaker line 10 and input microphone line 11. The hybrid 3 of the peripheral device 2 changes the connection from 4-wire to 2-wire, and a hybrid 4 of the terminal 1 connects the signal back to a 4-wire line. The GSM disturbance is induced inside the peripheral device 2 and generates a disturbance in both loudspeaker signal 10a and microphone signal 11a. The interfered microphone signal 11a is converted into a digital signal by an A/D-converter 5. The digital signal is then coded by a Digital Signal Processor (DSP) 6 and fed to a Radio Frequency (RF) unit 7 of the terminal 1, which sends TX bursts 8 spaced 4.615 ms apart to the network. The DSP 6 is used to perform channel coding and modulation, as well as speech coding for the input microphone signal 11a. For the signal coming from the network opposite processing is done in order to generate an analog loudspeaker signal.

In the case illustrated in FIG. 1 the GSM disturbance 10a that is detectable in the output of the loudspeaker 10 (an audible hum of 217 Hz) cannot be measured directly. As a result, it is difficult to remove the unknown disturbance signal. Another disturbance occurs in the direction of the microphone line 11a. As a result the audible humming can also be detected in the earphone of the answering phone. However, this disturbance can be directly measured and suppressed.

OBJECTS AND ADVANTAGE OF THE INVENTION

It is a first object and advantage of this invention to provide a method and apparatus for reducing or eliminating an undesirable audible disturbance that results from burst mode operation of a transmitter.

It is a further object and advantage of this object to reduce or eliminate an undesirable audible disturbance that is coupled into a Fixed Wireless terminal through an attached peripheral devise (e.g., an ordinary telephone device), the disturbance resulting from a burst mode operation of a transmitter.

It is also another object and advantage of this invention to reduce or eliminate an undesirable audible disturbance that is coupled into a Fixed Wireless terminal through an attached peripheral devise (e.g., an ordinary telephone device), the disturbance resulting from burst mode operation of a transmitter, while also taking into account irregularities that may occur in the transmitted bursts due to operation with a multiframe structure and discontinuous transmission.

SUMMARY OF THE INVENTION

The foregoing and other problems are overcome and the objects and advantages of the invention are realized by methods and apparatus in accordance with embodiments of this invention for suppressing transmitter burst mode disturbances in an audio band. The method and apparatus extracts a TDMA burst interference signal portion from a disturbed signal and processes the disturbed signal to generate a compensation signal. Logic is provided to recognize the multi-frame structure and the DTX mechanics of GSM, or any burst type (TDMA) air interface standard of interest, such as one defined by IS-136.

In accordance of this invention, a method for removing a disturbance signal from a framed input signal that is induced by a transmitter that transmits bursts of energy includes the steps of: (a) detecting those signal frames wherein the input signal contains signal energy comprised substantially of only the disturbance signal; (b) characterizing the disturbance signal in the detected signal frames to obtain a disturbance signal correction; and (c) compensating the input signal, only for those signal frames where a transmission burst exists, using the obtained disturbance signal correction so as to remove the disturbance signal from those signal frames that contain voice, and also from certain signal frames that do not contain voice.

The step of detecting the disturbance includes a step of filtering the input signal with filters matched to harmonic frequencies of the interference and to frequencies between the interference frequencies. Suitable matched filters can be, by example, Goertzel filters. Also included is a step of determining from the signal powers in each detected frequency whether the signal contains only interference or if there is also some other signal (e.g., speech) present.

The step of characterizing the disturbance preferably employs an adaptive line enhancer (ALE) type of adaptive Finite Impulse Response (FIR) filter to which the pure (detected) disturbance signal is fed. The FIR-ALE filter adapts to a continuous signal and extracts it from discontinuous signals, such as background noise.

For vocal components of speech the case is not so simple, since the vocal components also exhibit a continuous behavior. A such, the input signal is fed to the FIR-ALE only when the pure disturbance signal is detected to be present. From the input signal the interference portion is extracted after the signal has passed through the FIR-ALE filter. The coefficients of this adapted filter can then used to remove the disturbance portion of the signal also when there are other signal components (e.g., speech) present by feeding the input signal to a FIR filter which has the same filter coefficients as the adaptive filter.

The input signal can be compensated by subtracting the extracted interference portion from the input signal. This compensating is done for all signal portions during which TX bursts have been transmitted. Signal samples taken during IDLE frames can be left uncompensated since they do not include interference. During the DTX mode of transmission all signal frames detected (by VAD) to have audible signal, except IDLE frames, are compensated. In addition to these frames there also exist CNU frames during which the TX burst is transmitted. Samples taken during CNU frames are also compensated.

A disturbance removal system and method for a frequency hopped embodiment is also disclosed. In this case a method: (a) provides a plurality of allocatable buffers for storing information concerning a particular frequency used during the frequency hopping; (b) computes a normalized summed square difference for each buffer to yield normalized residuals $R_n$; (c) compares each normalized residual $R_n$ against an adaptive threshold; and, when all $R_n$ are larger than the adaptive threshold, (d) allocates a new buffer. If all $R_n$ are not larger than the adaptive threshold, the method instead (e) updates a buffer where $R_n$ is found to be the smallest and less than the adaptive threshold; and (f) increments an associated buffer counter. In a presently preferred embodiment the adaptive threshold has a value that is determined using a sliding median filter that is updated on every occurrence of a residual $R_n$ being found to be smaller than the adaptive threshold. The method further periodically tests the buffer counters, and if a buffer counter is found to be equal to or less than a threshold value, frees the associated buffer for use. This prevents a buffer from being permanently allocated after noise causes the buffer to be allocated.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
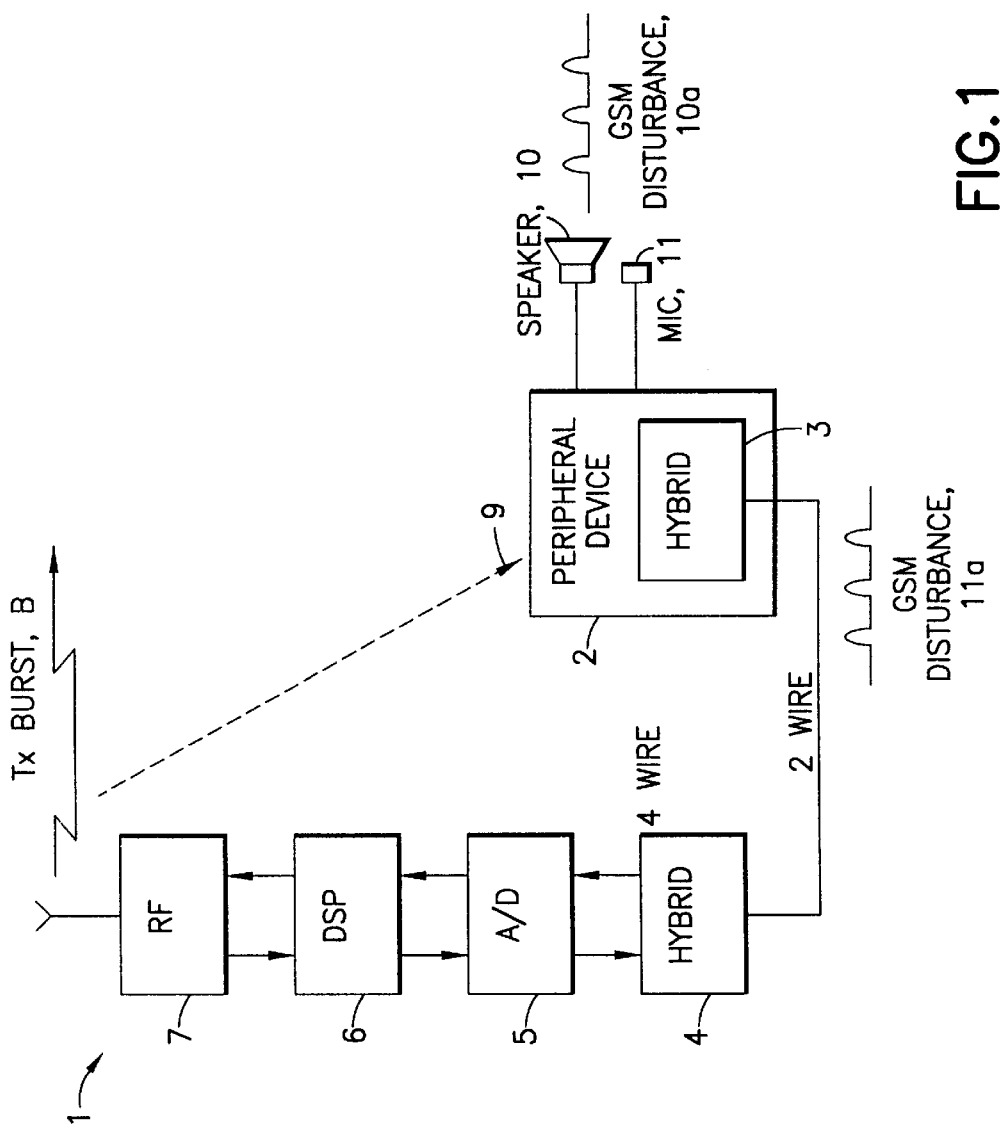
FIG. 1 is a block diagram of a Fixed Wireless terminal device configuration.

In the ensuing discussion of FIGS. 2–6 those components that are shown in FIG. 1 are numbered accordingly. It should be realized, however, that the DSP 6 is modified so as to operate in accordance with the teachings of this invention.

By way of introduction, in order to remove the 217 Hz and harmonics disturbance signal, in accordance with the teachings of this invention, the disturbance signal is first extracted from the digitized audio signal by the DSP 6. This is done in an adaptive filtering section shown in FIG. 2. It cannot, however, be assumed that the amount of induced disturbance on the microphone line 11a (see FIG. 1) is equal to the disturbance on the earphone line 10a, as both paths through the hybrid 3 are electrically and mechanically different. Measurements have shown that this is typically the case. As a result, disturbances are suppressed only in the direction of the microphone line 11a. The disturbance extraction may be performed through the use of an Adaptive Line Enhancer (ALE), which is an adaptive filter.

Figure 2:
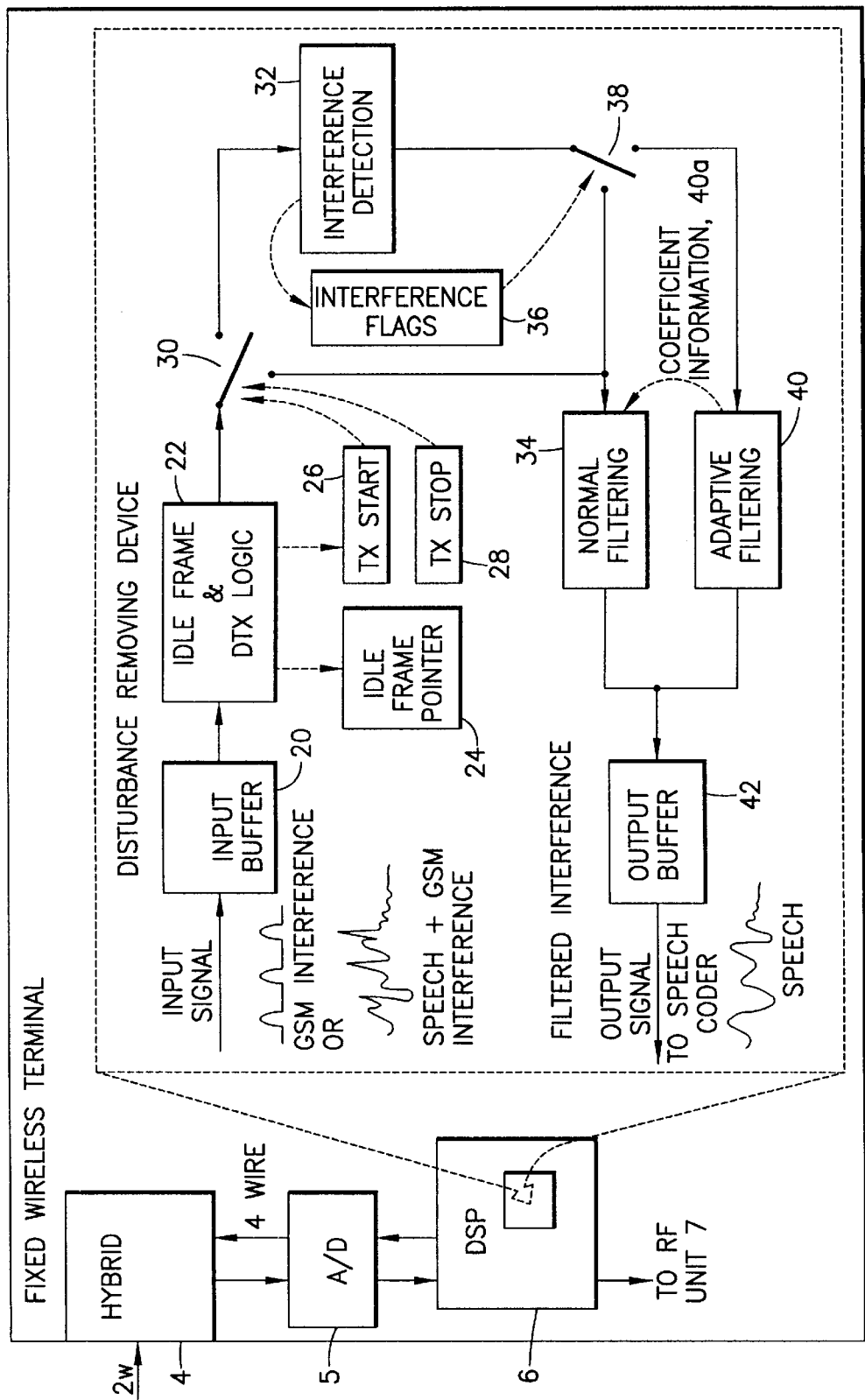
FIG. 2 illustrates an embodiment of a disturbance removing system as implemented in the DSP of the Fixed Wireless terminal in FIG. 1.

In FIG. 2 the disturbance removing device (which is preferably implemented at least partially as instructions executed by the DSP 6) includes an input buffer 20 for storing the digitized input signal. An output of the buffer 20 is applied to an Idle frame and DTX logic block 22 which is coupled to an Idle frame pointer 24 and TX start and TX stop blocks 26 and 28, respectively. The TX start and TX stop blocks 26 and 28 control the state of a switch 30 that selectively connects the output of the Idle frame and DTX logic block 22 to one of an interference detection block 32 or a normal filtering block 34. The interference detection block 32 has associated flags 36 which control the state of a second switch 38 so as to selectively connect the output of the interference detection block to one of the normal filtering block 34 or an adaptive filtering block 40 (preferably a FIR-ALE). The adaptive filtering block 40 provides filter coefficient information 40a to the normal filtering block 34. The outputs of filter blocks 34 and 40 are provided to an output buffer 42, which provides an output signal, such as a speech signal, that is preferably free of interference disturbances resulting from TDMA operation.

Although ALE-filters (see FIG. 4.) tend to adapt to the narrowband component of an input signal, they typically require a significantly large delay at the input in order to prevent long vocals in speech from interfering with disturbance extraction. To overcome this drawback the use of the interference detection block 32 is preferred. The interference detection block 32 detects those input signal portions which are comprised mainly of interference and sets the appropriate flags 36 according to this interference information. When an input signal block is detected to be mostly interference, it is filtered with the adaptive FIR-ALE 40. When the coefficients of the FIR-ALE 40 are converged, the output of the adaptive filter 40 is a substantially interference free signal.

For those portions of the input signal that also contain speech, or are interference free, the normal FIR filter 34 is used. The normal FIR filter 34 preferably operates with the same filter coefficients as the adaptive FIR-ALE 40, as indicated by the coefficient information 40a passed from the adaptive filter 40 to the normal FIR filter 34. The normal FIR filter 34 thus extracts the narrowband interference signal which is subtracted from the input signal to obtain the interference free output signal at the output buffer 42.

It is noted that in FIG. 2 two separate FIR filters have been shown: the adaptive filter 40 and the normal (non-adaptive) filter 34 which, however, uses the same coefficients as the adaptive filter 40. It should be realized that it may be preferable to use only one filter wherein the adaptation is interrupted by forcing the error signal to zero when there is no disturbance present or when the input signal includes speech. In this case some additional control is required when the adaptation is once again enabled after a speech period. When the adaptation is enabled, the delay line 40B of the filter should include a "pure" disturbance signal in order to prevent misadaptation. This can be accomplished by using two delay lines. The first delay line contains the last samples during which the coefficients of the filter have been adapted, while the second delay line is the delay line which is used during filtering. At the beginning of the adaptation the samples which include only the disturbance signal are copied from the first delay line to the second (actual) delay line.

In principle, when there is no disturbance in the signal, the filtering of the signal adds some disturbance to the signal. However, it has been found that the disturbance does not disappear suddenly, but instead that filter 40 has time to adapt to the decreased disturbance. When the disturbance has totally disappeared, the coefficients of the filter 40 have become so small that the filtering has no audible effect on the output signal.

It is also within the scope of the teaching of this invention to set the first coefficient to one and force the other coefficients to zero when there is no disturbance present in the four frames which are transmitted after the Voice Activity Detector (VAD) flag changes to zero (to indicate a cessation of speech).

It is further noted that the input buffer 20 is used only for those frames when the transmitter is on. During Idle frames and during the DTX mode (when the transmitter is off), the samples are not copied to the input filter 20, but are instead forwarded directly to a speech coder input buffer. During those frames which are transmitted, the output buffer 42 of the disturbance removal filter is instead copied to the input buffer of the speech coder. It should be noted, however, that these buffers can be physically the same data addresses in the memory of the DSP 6.

Figure 3:
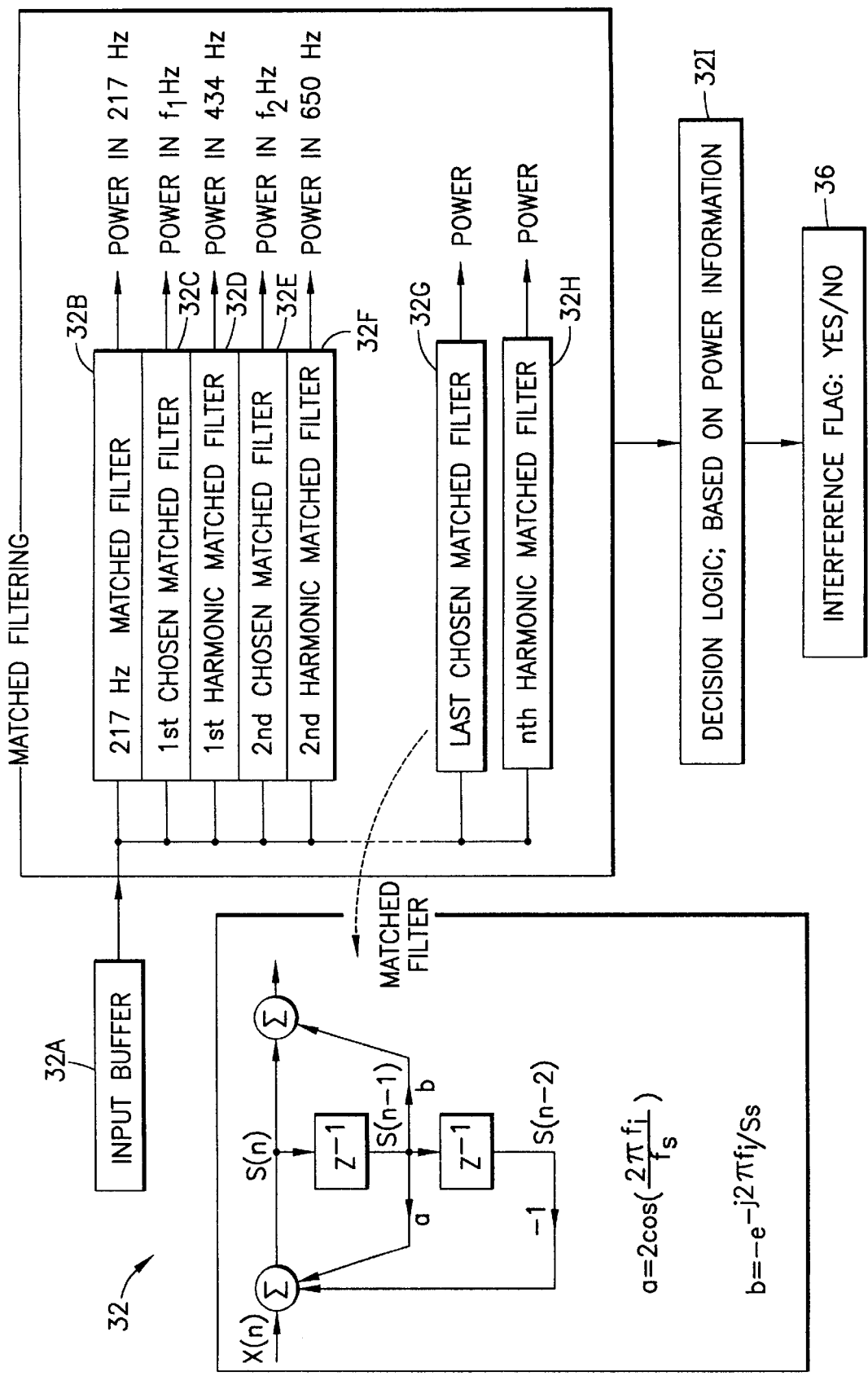
FIG. 3 is a block diagram of the interference (disturbance) detector shown in FIG. 2.

Referring now to FIG. 3, the interference detection block 32 is comprised of an input buffer 32A, a matched filtering block comprised of various filters 32B–32H, and a decision logic block 32I providing an output to the interference flags block 36. In the presently preferred embodiment of this invention the matched filters are implemented as Goertzel filters which provide a relatively simple method to calculate the signal power in a certain frequency band. In the illustrated embodiment a 217 Hz matched filter 32B is provided, as are first harmonic (434 Hz), second harmonic (650 Hz) and $n^{th}$ harmonic matched filters 32D, 32E and 32H. The insert drawing depicts the construction of a Goertzel filter, such as the matched filter 32G. Also provided are selected matched filters 32C, 32E and 32G each providing an output indicating the power at a selected frequency $f_1$, $f_2$, etc.

After calculating signal powers at the interference frequency and its harmonics, as well as the selected frequencies, a decision is made in block 32I whether the signal is comprised mainly of interference. If there is some other signal present as well (e.g., speech detected by one or more of the matched filters 32C, 32E, 32G) the decision logic block 32I determines that the input signal does not contain pure interference and sets the interference flag to a 'No_Interference' position. Together with the information of the interference decision of the present signal block, information regarding the interference decision of the previous signal block is also maintained.

In FIG. 3 the interference detection is accomplished by comparing the signal powers at certain frequencies. The signal power of the interference frequencies (217 Hz and harmonics) and frequencies lying in between the interference frequencies are calculated with the matched Goertzel filters 32B–32H. Assuming that frequency $f_i$ is set to the chosen value and $f_s$ is the sampling rate the output power at the selected frequency can be calculated with the following equation:

$$|X(f_i)|^2 = |S(n)|^2 - 2\cos\left(\frac{2\pi f_i}{f_s}\right)S(n)S(n-1) + |S(n-1)|^2$$

The decision of interference/not interference is based on the signal power information. When the signal powers of the interference frequencies are larger by some threshold amount than the power of the in-between frequencies the input signal can be determined to be mainly interference. In order to be declared as interference the signal powers in each interfering frequency preferably also have a predetermined relationship to one another. Only if these two conditions are met is the input signal determined to contain mostly interference, and thus it can be used for extracting the interference component from the input signal.

In the presently preferred embodiment the interference detection is performed every 20 ms for input signal frames wherein DTX is not active. If DTX is active, such as Tx-off or TX-on, during the input signal frame the signal is always treated as if it does not contain only interference, and is filtered with the normal filter 34 of FIG. 2. This action can be controlled by a second flag (e.g., a DTX active flag) connected to the switch 38.

Figure 4:
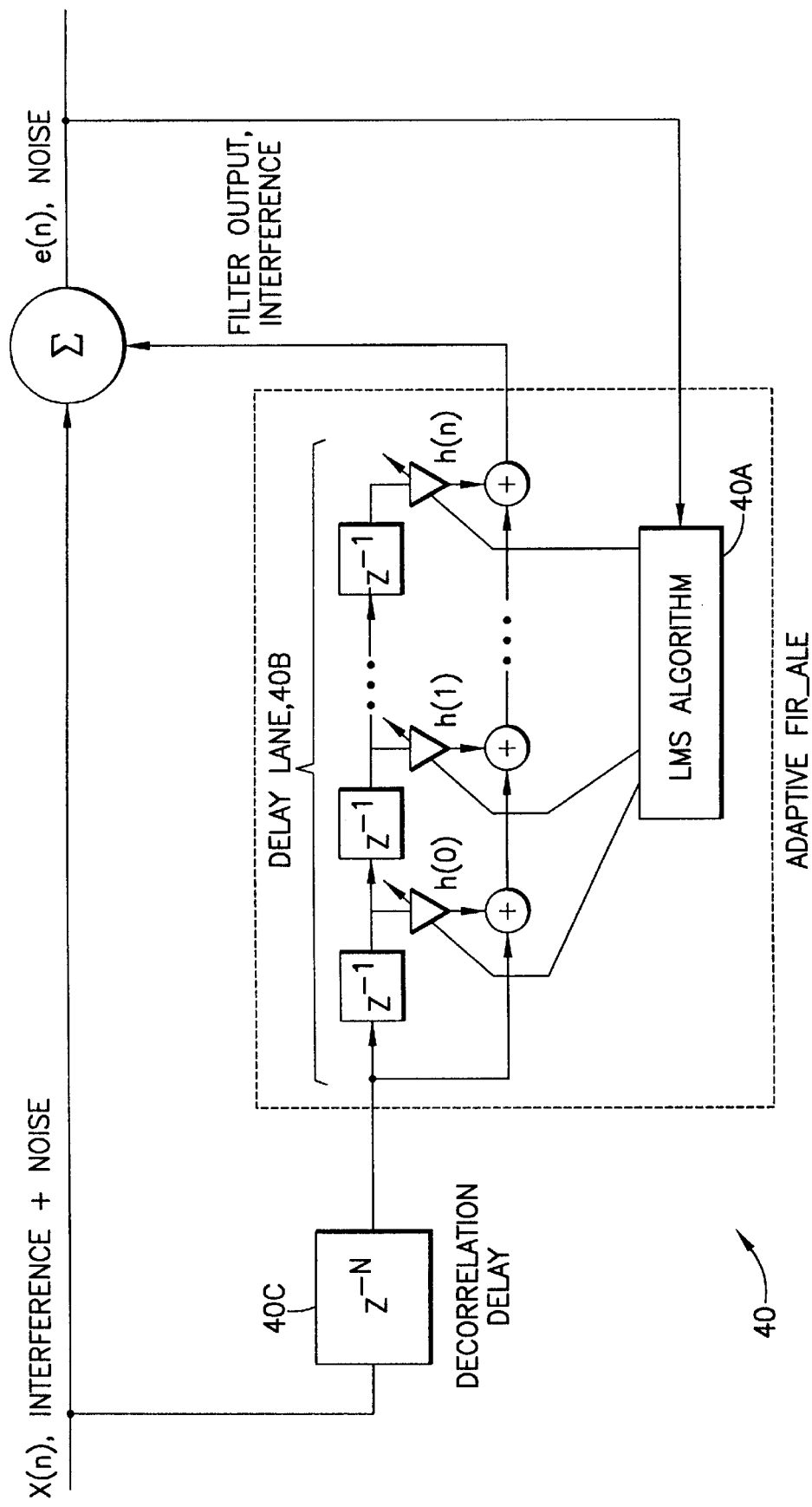
FIG. 4 is a diagram showing different control actions of a method of this invention. IDLE frame and DTX logic and operations are illustrated.

When the signal is instead detected to contain mostly interference it is filtered with the adaptive FIR-ALE filter 40, which is shown in greater detail in FIG. 4. It is noted that although the adaptive filter 40 is implemented as an adaptive Least Mean Squares (LMS) algorithm 40A, other adaptive algorithms such as a Normalized LMS or NLMS could be used as well. With the LMS embodiment the coefficient update equation is:

$$H(n)=H(n-1)+2ue(n) \times (n)$$

where u is the adaptation coefficient, H is the filter coefficient vector, e is a filtering error, x is an input signal vector and n is present time. The adaptation coefficient u is typically about 0.1. The adaptive FIR-ALE filter 40 delays the input signal x(n) with coefficients H(n−1). The output y(n) is then subtracted from the input signal to obtain the error signal e(n). The filter coefficients are then adjusted with respect to the previously mentioned coefficient update equation. The delay in the input is used to decorrelate the input data. After some time to allow for adaptation the output of the FIR-ALE filter 40 is the interference signal. As such, the error signal e(n) can be used as the output signal of the interference removing device.

During Idle frames, and with the DTX operation active during periods of no transmission, the input signal is not filtered since at these times it contains no interference due to an absence of TX bursts from the RF unit 7. During this time the signal blocks are preferably simply passed through. The Idle frame and DTX logic block 22 (FIG. 2) is responsible for detecting the DTX active times.

More particularly, during the operation of the DSP software of the Fixed Wireless terminal 1 certain software modules are responsible for implementing the Idle frame and DTX-logic 22. These modules provide information concerning the Idle frame start time and the transmission stop/start times when operating in the DTX mode. The indicated times are used for controlling the copying of signal samples into the filter's input buffer 20 such that if a signal sample is taken during an Idle frame it is not stored the input buffer 20. This allows the interference signal in the filter input buffer 20 to remain cyclo-stationary. Both the interference detector 32 and the interference extractor/subtractor use this cyclo-stationary interference signal. After filtering the filtered samples are copied into the signal input buffer while Idle frame samples are not processed.

A suitable length of the FIR filter is preferably 100 taps, and the decorrelation delay 40C need be only one sample when the interference detector 32 is used. As was noted earlier, the preferred value for the adaptation constant of the ALE filter 40 is 0.1.

Figure 5A:
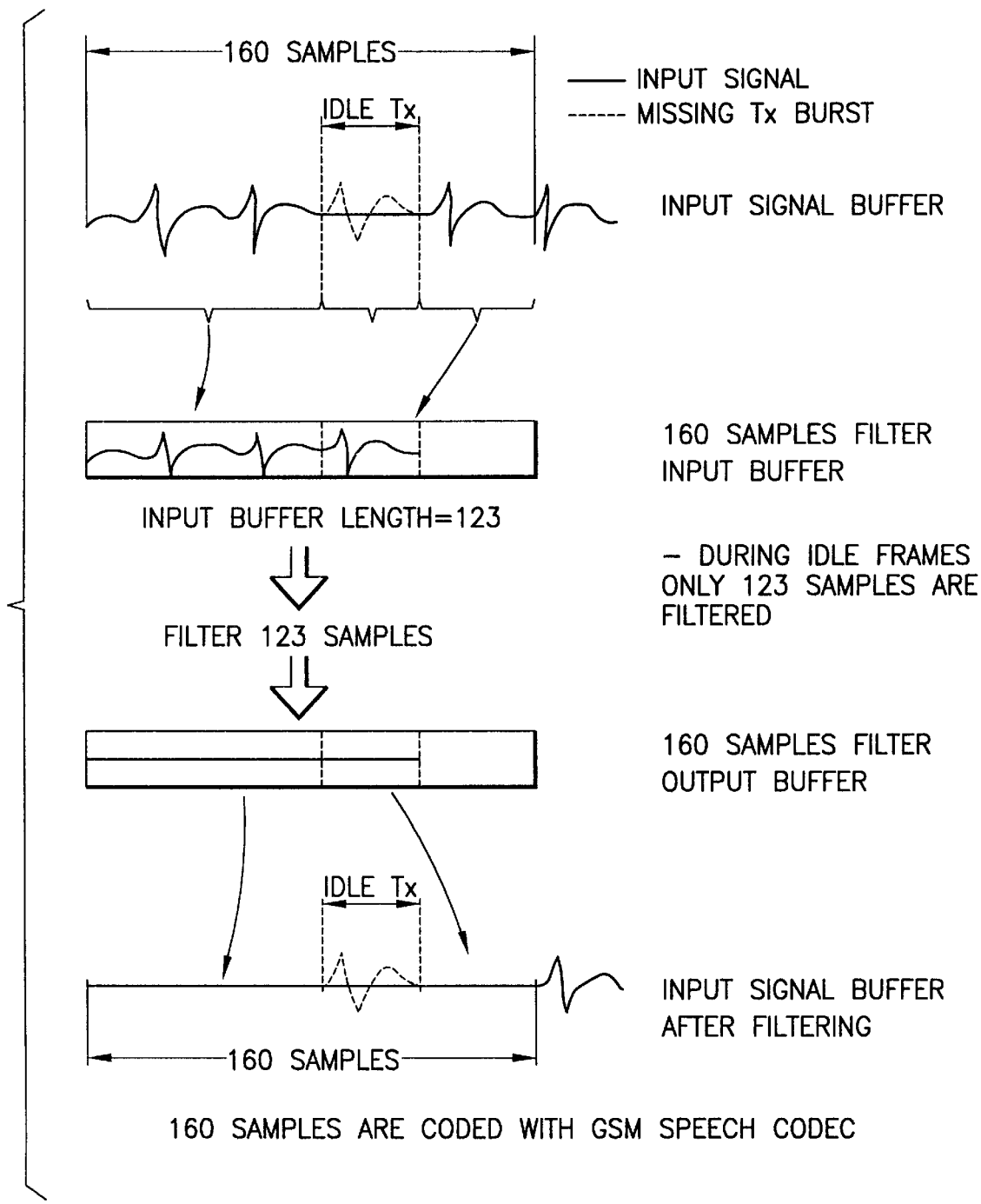
FIGS. 5a through 5d illustrate control operations during IDLE frames and DTX operations.

FIG. 5a describes the operation of the circuitry during GSM Idle frames.

Figure 5B:
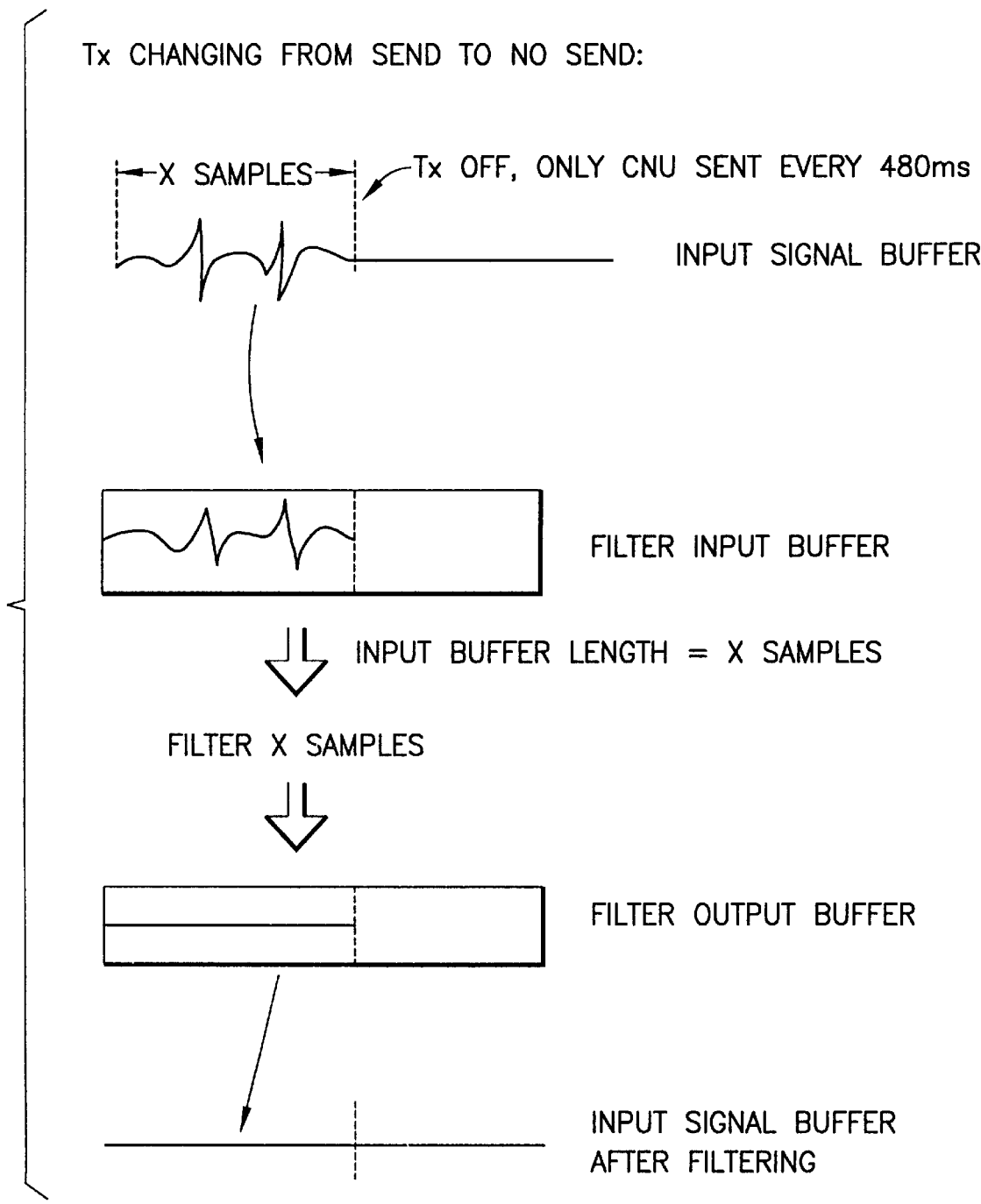
Figure 5C:
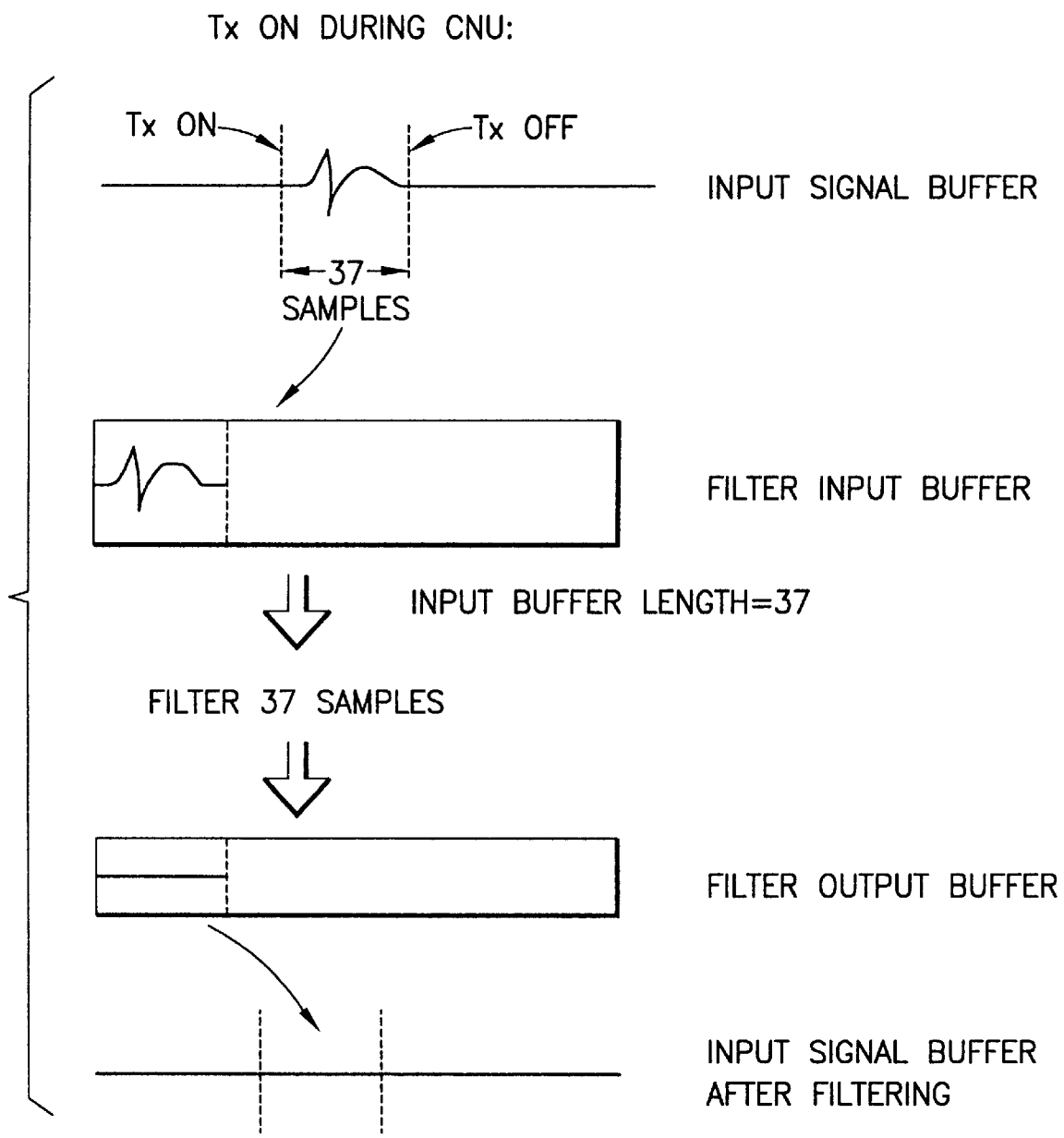
Figure 5D:
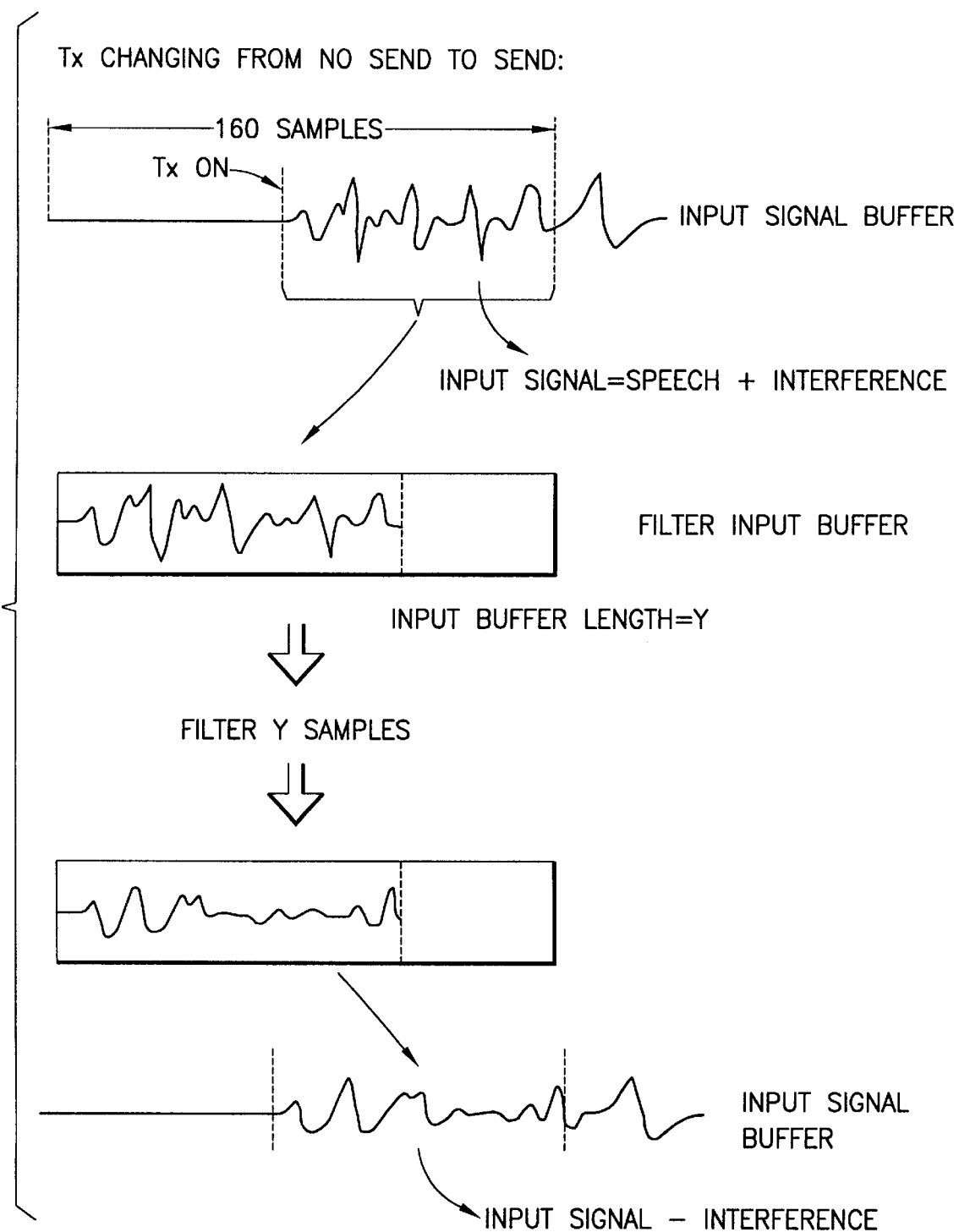

When operating in the DTX mode the input samples are only filtered when Tx bursts are sent. The DTX software modules insure that only the samples taken during Tx bursts are sent to the filtering blocks. FIGS. 5b through 5d illustrate the operation of the circuitry to achieve DTX control.

When switching the blocks of signal between the adaptive filter 40 and the normal filter 34 it is important to insure that the signal (interference) input to the adaptive filter 40 remains cyclo-stationary. A presently preferred solution uses a peak search algorithm for this purpose.

Figure 6A:
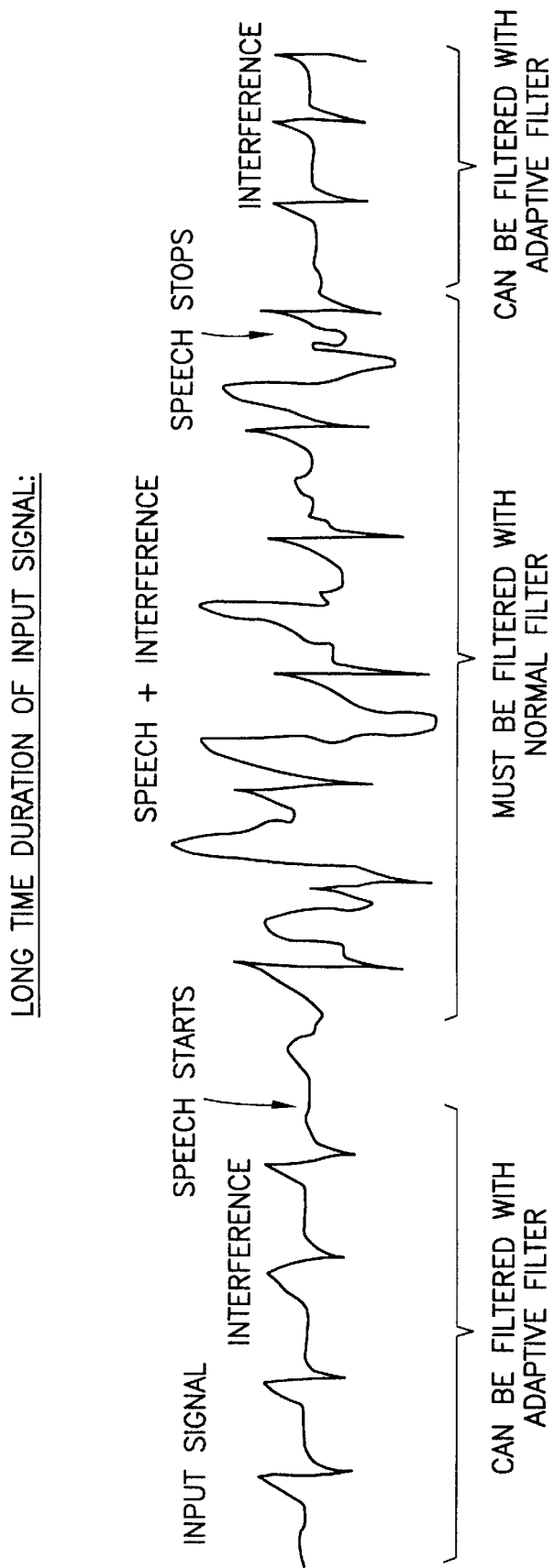
FIGS. 6a and 6b illustrate the control of the continuity of the signal that is fed into the adaptive FIR-ALE, and show the operation of a peak detector. A result of feeding discontinuous interference into the FIR-ALE would be an erroneous filtering for some period of time, a situation that is avoided in the presently preferred embodiment of the invention.
Figure 6B:
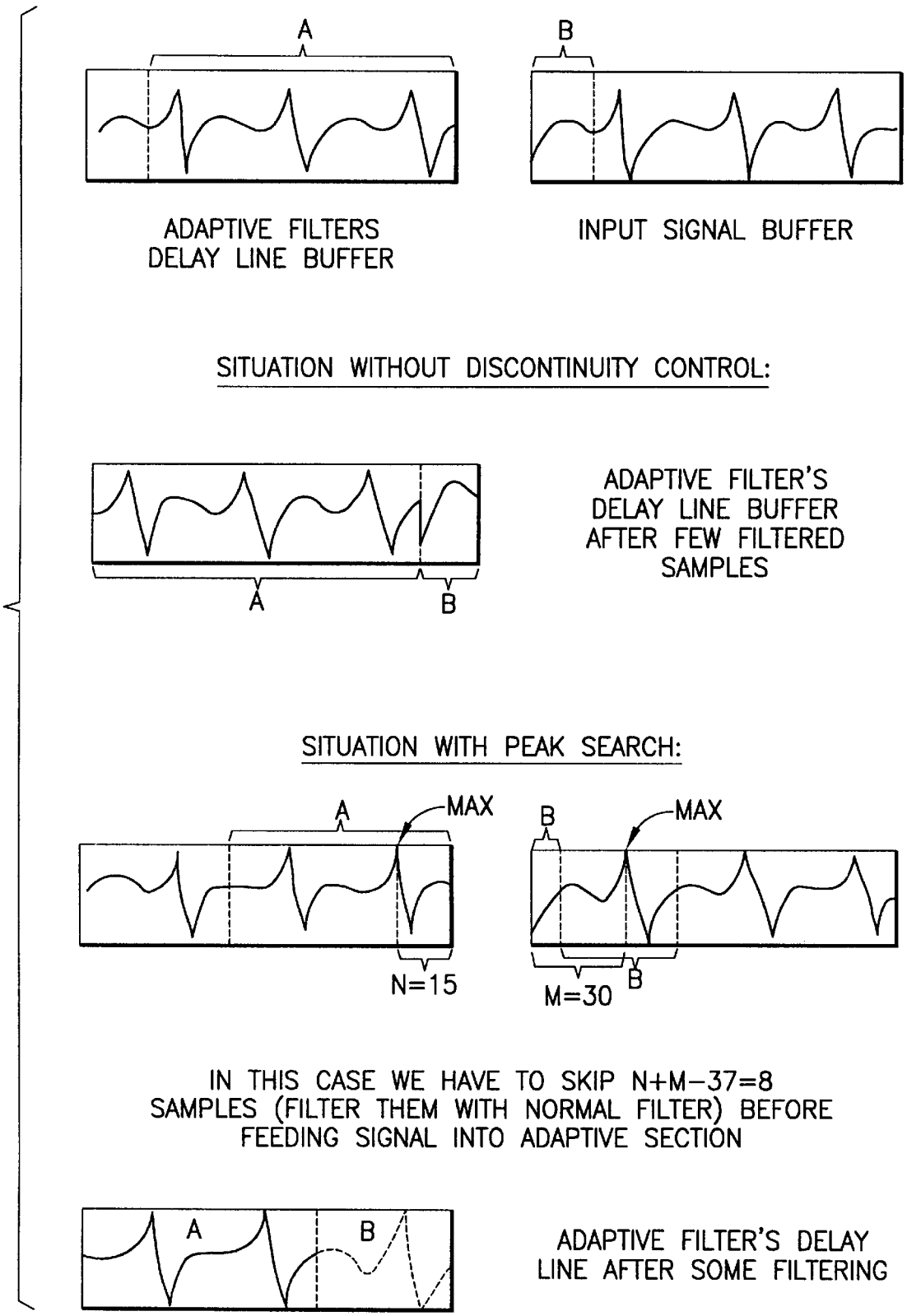

FIG. 6a illustrates one typical situation when feeding signal into the adaptive filter 40 after a break in adaptation (i.e., signal has been mostly interference in the past, but the latest audio frame contained a signal component other than interference and was therefore input to the normal filter 34). The peak search is done for both the input signal frame and the delay line 40B of the LMS algorithm 40A (see FIG. 4). The decorrelation delay 40C must also be taken into account. Referring to FIG. 6b, the operation of the peak search algorithm is as follows.

The peak search algorithm, which may be incorporated into the DTX logic 22, locates the maximum of both the first 37 samples of the input signal frame in the input buffer 20 and the 37 newest samples in the adaptive filter's delay line 40B. If the maximum value of the first 37 samples in the signal input buffer 20 is below threshold, the frame is filtered with the normal filter 34. The peak search algorithm also checks the distance between peak values and matches the peaks so that the distance becomes equivalent to 37 samples, which is one interference period. In this regard, if the signal is sampled at 8 kHz, 37 samples is equal to 4.625 ms, which is close to the TX period of 4.615 ms.

Filtering of the input signal after the peak search algorithm is performed as follows. Those signal samples that are to be skipped in order to have a continuous interference signal in the adaptive filter's delay line 40B are filtered with the normal filter 34 and the result is placed in the appropriate locations in the filter output buffer 42. The remainder of the signal samples are filtered in the adaptive filter 40, and the result is also placed in the output buffer 42. In this manner the signal input to the adaptive filter 40 remains continuous.

To summarize to this point, in order to remove the 217 Hz GSM disturbance signal, in accordance with the teaching of this invention, the disturbance signal is detected and extracted from the digitized audio signal by the DSP 6 and is then used to compensate the sampled signal. It cannot, however, be assumed that the amount of induced disturbance 11a on the microphone line is equal to the disturbance 10a on the speaker line, as both paths through the hybrid 3 are electrically and mechanically different. As a result, disturbances are suppressed in the direction of the microphone line.

Figure 7:
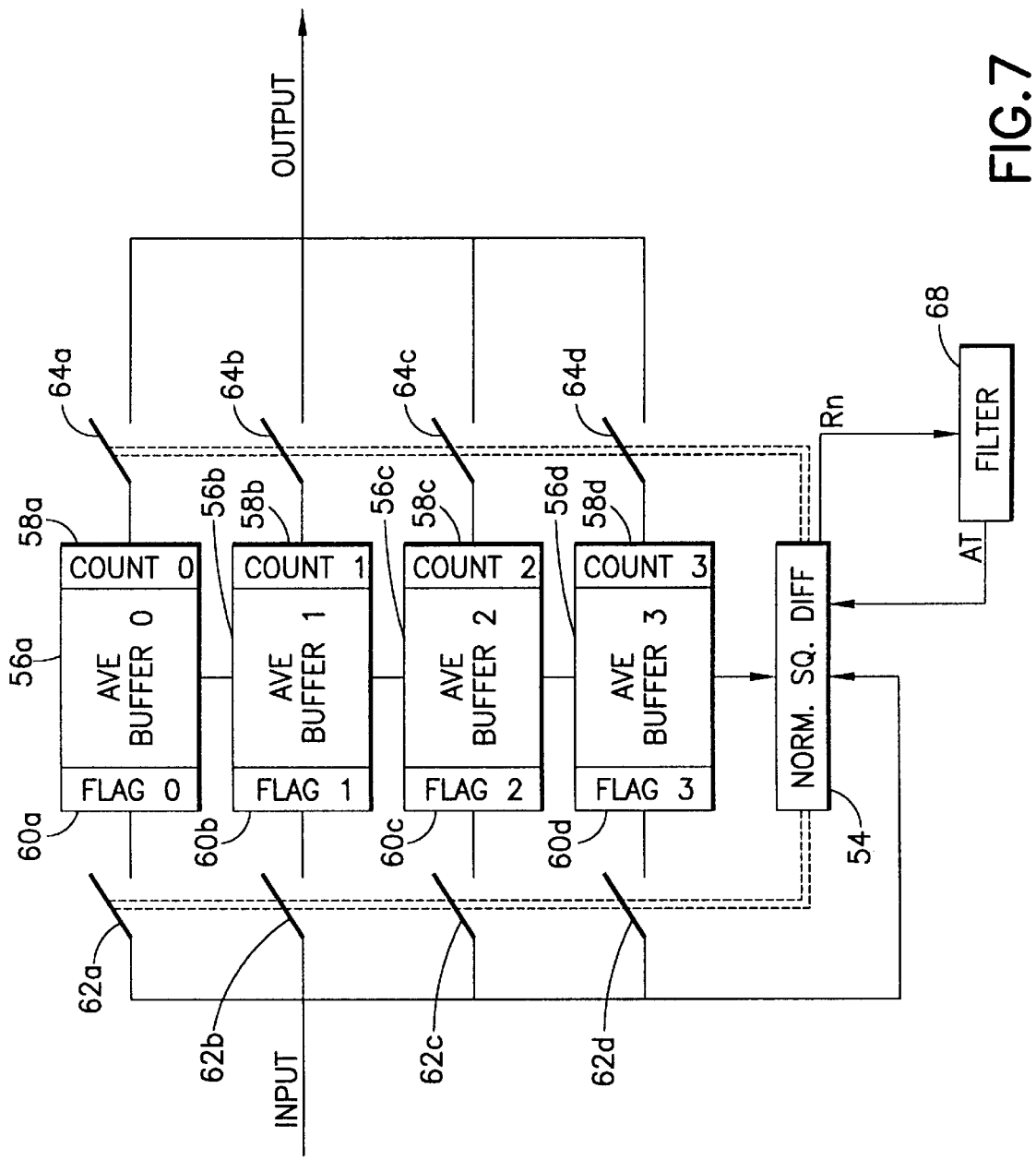
FIG. 7 illustrates an embodiment of an error signal extractor and buffer for use in a frequency hopped burst transmission system.
Figure 8:
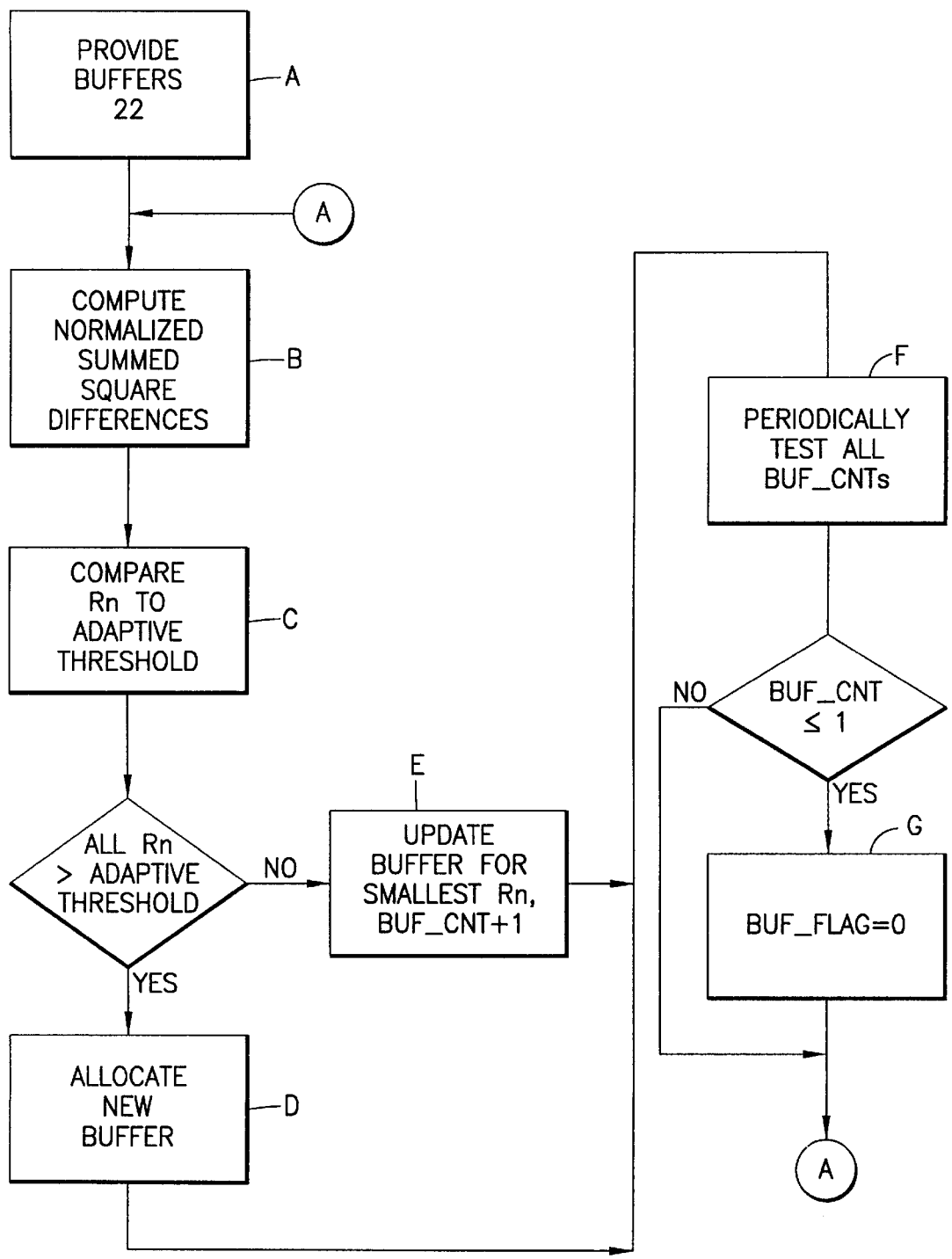
FIG. 8 is a logic flow diagram illustrating the operation of the embodiment of FIG. 7.

When frequency hopping is used (see, for example, GSM 03.30, version 4.3.0, ETR 103, February 1995, page 14, and GSM 05.02, version 4.7.0, draft prETS 300 574, March 1996, pages 18, 19, 37 and 38), it is preferred to use a multi-average buffer system of FIG. 7, with adaptive buffer allocation, to eliminate the disturbance. Adaptive buffer allocation is performed by providing an error signal extractor and buffer so as to determine a multidimensional Euclidean distance between disturbance signals which is calculated by summed squared differences between the incoming signal and the averaged signal in block 54, normalized by the energy stored in average buffers 56a, 56b, 56c, and 56d. This embodiment provides a plurality of buffer counters 58a, 58b, 58c, and 58d, and buffer free flags 60a, 60b, 60c, and 60d, in combination with an adaptive threshold system. A plurality of input switches 62a–62d and output switches 64a–64d are selectively controlled by the block 54.

In operation, a check is made to determine whether one of the buffers 56 is free to allocate (i.e., at least one buffer free flag 60 must be zero). Next, a normalized summed square difference for each buffer 56 is computed yielding normalized residuals $R_n$. Each normalized residual is compared against the adaptive threshold (AT). When all $R_n$ are larger than the adaptive threshold, an attempt is made to allocate a new buffer 56, otherwise the buffer is updated where the difference (and thus $R_n$) was found to be the smallest. A buffer update causes an increment of the associated buffer counter 58. Every 26th disturbance burst (i.e., one multi-frame in GSM) the counters 58a–58d are tested. If a counter value is found to be less than or equal to one, the corresponding buffer 56 is freed (the associated flag 60 is reset) and is available for allocation. The counter value of one is used so as to eliminate those buffers 56 that may have been allocated due to an erroneous determination of the disturbance energy during one burst. The number of buffers 56 having a counter 58 value greater than one is indicative of the number of different TX frequencies that are being used in the frequency hopping scheme, and each buffer contains information regarding the magnitude of the disturbance associated with that particular frequency band. Using this technique it is ensured that both slowly varying changes and rapidly varying changes can be learned efficiently.

The adaptive threshold (AT) is computed using, preferably, a M deep sliding median filter 68 that is updated on an occurrence of every minimum value of $R_n$. In a practical implementation with minimal frequency hopping the number of required buffers 56 can be as few as four (as illustrated).

In the frequency hopping embodiment, wherein the transmitter transmits bursts of energy in different frequency bands, the extraction of the disturbance signal determines a multidimensional Euclidean distance between disturbance signals transmitted in the different frequency bands.

More particularly, and referring to FIG. 7, in this case the extraction of the disturbance signal includes the steps of: (A) providing a plurality of allocatable buffers 56; (B) computing a normalized summed square difference for each buffer 56 to yield normalized residuals $R_n$; (C) comparing each normalized residual $R_n$ against an adaptive threshold (AT); when all $R_n$ are larger than the adaptive threshold, (D) allocating a new buffer 56; else, (E) updating a buffer 56 where $R_n$ is found to be the smallest and less than the adaptive threshold, and incrementing the associated buffer counter 58 (BUF_CNT+1). Further steps include (F) periodically testing the buffer counters 58, and if a buffer counter 58 is found to be equal to or less than a threshold value (e.g., one), (G) freeing the associated buffer 56 for use by resetting the associated buffer flag 60 (BUF_FLAG=0). In the described embodiment the adaptive threshold has a value that is determined using the sliding median filter 68 that is updated on every occurrence of a residual $R_n$ being found to be smaller than the adaptive threshold.

Although described primarily in the context of GSM, those skilled in the art will recognize that the foregoing teachings apply as well to any of a number of different types of digital cellular protocols that transmit information in bursts at assigned times. For example, a system based on the TDMA IS-136 protocol can also take advantage of this invention. In fact, any system that makes repetitive transmissions, including many Code Division Multiple Access systems, can employ the teachings of this invention.

Thus, while the invention has been particularly shown and described with respect to preferred embodiments thereof, it will be understood by those skilled in the art that changes in form and details may be made therein without departing from the scope and spirit of the invention.

What is claimed is:

1. A method for removing a disturbance signal from an input signal that is induced by a transmitter that transmits bursts of energy using a frequency hopping technique, comprising the steps of:

providing a plurality of allocatable buffers each for storing information concerning a particular frequency used during the frequency hopping;

computing a normalized summed square difference for each buffer to yield normalized residuals $R_n$;

comparing each normalized residual $R_n$ against an adaptive threshold; and when all $R_n$ are larger than the adaptive threshold, allocating a new buffer;

else, updating a buffer where $R_n$ is found to be the smallest and less than the adaptive threshold; and incrementing an associated buffer counter.

2. A method as set forth in claim 1, and further comprising the steps of:

periodically testing the buffer counters, and if a buffer counter is equal to or less than a threshold value, freeing the associated buffer for use.

3. A method for removing a disturbance signal from an input signal that is induced by a transmitter that transmits bursts of energy using a frequency hopping technique, comprising the steps of:

providing a plurality of allocatable buffers each for storing information concerning a particular frequency used during the frequency hopping;

computing a normalized summed square difference for each buffer to yield normalized residuals $R_n$;

comparing each normalized residual $R_n$ against an adaptive threshold; and when all $R_n$ are larger than the adaptive threshold, allocating a new buffer;

else, updating a buffer where $R_n$ is found to be the smallest and less than the adaptive threshold; and incrementing an associated buffer counter, wherein the adaptive threshold has a value that is determined using a sliding median filter that is updated on every occurrence of a residual $R_n$ being found to be smaller than the adaptive threshold.

* * * * *